(12) United States Patent
Weimer et al.

(10) Patent No.: US 10,430,680 B2
(45) Date of Patent: Oct. 1, 2019

(54) IMAGE PROCESSING ALGORITHM

(71) Applicant: Robert Bosch GmbH, Stuttgart (DE)

(72) Inventors: Florian Weimer, Renningen (DE); Matthias Birk, Leinfelden-Echterdingen (DE); Omar Alaa El-Din, Hannover (DE); Steffen Brueggert, Hildesheim (DE); Tobias Rentschler, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 15/702,828

(22) Filed: Sep. 13, 2017

(65) Prior Publication Data

US 2018/0075311 A1    Mar. 15, 2018

(30) Foreign Application Priority Data

Sep. 15, 2016    (DE) .................. 10 2016 217 636

(51) Int. Cl.
*G06K 9/00* (2006.01)
*B60W 50/06* (2006.01)
*B60W 30/08* (2012.01)
*B60W 50/00* (2006.01)

(52) U.S. Cl.
CPC ......... *G06K 9/00993* (2013.01); *B60W 50/06* (2013.01); *G06K 9/00* (2013.01); *G06K 9/00973* (2013.01); *B60W 30/08* (2013.01); *B60W 2050/0006* (2013.01); *B60W 2050/065* (2013.01); *B60W 2510/20* (2013.01); *B60W 2520/105* (2013.01); *B60W 2540/10* (2013.01); *B60W 2540/12* (2013.01); *B60W 2540/18* (2013.01); *B60W 2550/12* (2013.01); *B60W 2550/402* (2013.01); *G06K 9/00805* (2013.01); *G06K 9/00818* (2013.01)

(58) Field of Classification Search
CPC ...... B60W 50/14; B60W 10/18; B60W 10/20; B60W 2540/10
USPC ....... 382/307, 103, 104, 106, 107, 163, 209; 701/11, 13, 23, 36, 42
See application file for complete search history.

(56) References Cited

U.S. PATENT DOCUMENTS

| | | | | |
|---|---|---|---|---|
| 6,580,988 B2* | 6/2003 | Lin | ........................ | B62D 7/159 180/443 |
| 7,311,085 B2* | 12/2007 | Ogawa | ................... | F02M 45/06 123/495 |
| 7,883,013 B2* | 2/2011 | Skaaksrud | ............. | G06Q 10/08 235/384 |

(Continued)

OTHER PUBLICATIONS

Buttazzo, et al. "Rate-Adaptive Tasks: Model, Analysis, and Design Issues", Proceedings of International Conference on Design, Automation and Test in Europe (2014), pp. 1-12.

(Continued)

*Primary Examiner* — Yosef Kassa
(74) *Attorney, Agent, or Firm* — Norton Rose Fulbright US LLP; Gerard Messina

(57) ABSTRACT

A method is claimed for allocating processor/computing times of a processor or of a computing unit for a vehicle system of a vehicle. The vehicle system is in particular a driver assistance system. The vehicle system has at least two functions, in particular two functions of the driver assistance system, to which processor/computing times are allocated as a function of a signal that represents a state of the vehicle.

12 Claims, 3 Drawing Sheets

(56) References Cited

U.S. PATENT DOCUMENTS

| | | | | |
|---|---|---|---|---|
| 8,170,761 | B2 * | 5/2012 | Kraenzlein | F16K 37/0091 |
| | | | | 701/58 |
| 8,315,617 | B2 * | 11/2012 | Tadayon | H04W 4/50 |
| | | | | 455/418 |
| 8,354,932 | B2 * | 1/2013 | Schmitz | G01S 13/931 |
| | | | | 180/167 |
| 8,360,183 | B2 * | 1/2013 | Sauvlet | B60K 6/48 |
| | | | | 180/65.28 |
| 8,373,582 | B2 * | 2/2013 | Hoffberg | G08G 1/0104 |
| | | | | 340/995.13 |
| 8,543,261 | B2 * | 9/2013 | Anderson | B60W 30/09 |
| | | | | 701/3 |
| 8,615,357 | B2 * | 12/2013 | Simon | G08G 1/167 |
| | | | | 340/435 |
| 9,156,352 | B2 * | 10/2015 | Kim | B60K 28/066 |

OTHER PUBLICATIONS

Guo, et al. "A Survey of Real-Time Automotive Systems", https://www.s4ematicscholar.org, (2015), pp. 1-21.

Otterness, et al. "GPU Sharing for Image Processing in Embedded Real-Time Systems", Proceedings of OSPERT (2016), France, pp. 1-6.

* cited by examiner

IMAGE PROCESSING ALGORITHM

CROSS REFERENCE

The present application claims the benefit under 35 U.S.C. § 119 of German Patent Application No. DE 102016217636.6 filed on Sep. 19, 2016, which is expressly incorporated herein by reference in its entirety.

FIELD

The present invention relates to an image processing algorithm.

BACKGROUND INFORMATION

Various image processing algorithms are available in the related art. In order to enable a reliable object recognition, the image processing algorithms used for this purpose are generally granted the maximum computing capacity required for the various calculations. As a result, the overall computing capacity required by a system increases massively when a plurality of image processing algorithms are used.

SUMMARY

In accordance with the present invention, a method is provided for allocating processor/computing times of a processor or of a computing unit for a vehicle system of a vehicle. Here, the vehicle system is in particular a driver assistance system. The vehicle system has at least two functions, in particular two functions of the driver assistance system, to which processor/computing times are allocated as a function of a signal that represents a state of the vehicle.

This method may offer the advantage that the overall required computing capacity/computing power of the vehicle system can be reduced. Through an intelligent allocation of processor/computing times of a processor or a computing unit, the required resources can be distributed intelligently to the various functions. This distribution takes place as a function of a signal that represents a state of the vehicle. Using this signal, it is possible to allocate computing capacities in such a way that a use of the computing power that is as efficient as possible can be ensured, while at the same time there are no limitations on the safety of a vehicle system, in particular a driver assistance system. Through the introduction of adaptive runtime regulation, i.e., the allocation of processor/computing times of a processor or of a computing unit, in particular a plurality of object recognition algorithms and/or image processing algorithms can be used for which large computing capacities are required. Through the method and the adaptive allocation of computing times for the image processing algorithms, despite limited computing resources a high degree of availability of the entire vehicle system can be ensured.

In an advantageous specific embodiment of the method, each function has assigned to it a control loop that requests a processor/computing time for the associated function.

This specific embodiment has the advantage that the allocation of processor/computing time for the associated function can take place adaptively, so that an optimal allocation can be carried out in a manner adapted to the present driving situation/vehicle state.

In an advantageous specific embodiment of the method, a priority is assigned to each function, and the control loops request the respective processor/computing times for the associated functions in the sequence of the priority of the functions.

This specific embodiment offers the advantage that the prioritization enables an increase in vehicle and occupant safety. Various functions can for example be various image processing algorithms designed to recognize different types of objects. The object types can for example be other vehicles, pedestrians, animals, or other objects.

In an advantageous specific embodiment of the method, the associated priorities are assigned to the functions as a function of the signal representing the vehicle state.

This specific embodiment has the advantage that a prioritization of the most relevant functions can be carried out adapted to the current vehicle state, recognized by the corresponding signal that represents the vehicle state. Consequently, as a function of the current vehicle state a maximum degree of safety can be ensured, for example of a driver assistance system having various object recognition algorithms.

In an advantageous specific embodiment of the method, the processor/computing times allocated to the functions are adapted as a function of the ratio of tasks given to the function to tasks processed by the function in the allocated processor/computing time.

This specific embodiment offers the advantage that the computing capacities required for various functions can be continuously monitored. If, for example, it turns out that a function was allocated so much computing capacity that all the tasks it was given were able to be processed, then in the next step this function can be given either an equal amount of, or less, computing capacity. Through the continuous monitoring, it can be ensured that the most important functions are given a correspondingly large amount of capacity, and that individual functions are not allocated too much computing capacity/computing time/processor time, which could then be lacking for other functions.

In a further specific embodiment of the method, the processor/computing times allocated to the functions are adapted as a function of the difference and/or the ratio of the processor/computing time allocated to the function and the processor/computing time actually required by the function for the processing of tasks given to the function.

This specific embodiment also offers the advantage that an optimal allocation of processor/computing times takes place.

In a preferred specific embodiment of the present invention, at least one function is designed for object recognition. In particular, at least one function is designed for recognizing vehicles or pedestrians or traffic signs.

This specific embodiment of the present invention offers the advantage that objects relevant to driving operation of a vehicle can be recognized. These object types can for example be required in order to enable partly, highly, or fully automated driving.

In an advantageous specific embodiment of the method, the vehicle state describes a speed, a steering angle, an acceleration, or a setting of an operating element, in particular of a gas pedal or brake pedal.

This specific embodiment of the present invention offers the advantage that the allocation of processor/computing times can be adapted as a function of parameters relevant for the functions. The allocation of different processor/computing times here takes place for example as a function of one of the named parameters. Using this parameter, it is possible to prioritize different functions for object recognition. For example, different objects are differently relevant as a function of the speed. At low speeds, for example the recognition of pedestrians may be more relevant than the recognition of vehicles or traffic signs.

In an advantageous specific embodiment of the present invention, the allocation of the processor/computing time takes place in real time.

This specific embodiment offers the advantage that an immediate adaptation of the processor/computing times takes place as a function of the situation. In this way, a maximum degree of safety of a driver assistance system based on the functions can be ensured.

In an advantageous specific embodiment of the method, the allocation of the processor/computing times takes place as a function of environmental parameters, in particular as a function of brightness.

This specific embodiment offers the advantage that, using further parameters, in this case environmental parameters, an optimal allocation of processor/computing times can take place. Because the required processor/computing times of different functions, in particular functions for object recognition and/or image processing, can change as a function of environmental parameters, the inclusion of environmental parameters offers the advantage of faster and better allocation of processor/computing times to the respective functions. For example, the brighter or the darker an image that is to be evaluated by a function is, the less, or more, processor/computing time must be allocated to the corresponding image processing function or object recognition function. Here, the brightness of the image is associated immediately with the brightness of the surrounding environment, and for this reason in particular the brightness of the surrounding environment is suitable as environmental parameter. The brightness may be ascertained, for example, via specific brightness sensors or via an evaluation of camera images.

In addition, it is possible to determine the brightness on the basis of further parameters. For example, for this purpose the clock time and/or the date and/or the location may be used. For example, using one of the parameters, or a combination of these parameters, it is possible to ascertain brightness levels at different locations at different times in the world. In addition, it is possible to use weather information. Depending on weather conditions, different visibility conditions arise, which can be relevant in the allocation of processor/computing times. For example, when there is darkening due to clouds or due to precipitation or snow, the processor/computing times can be adapted.

In addition, it is also possible to use GPS and map information. A combination of such information makes it possible for example to ascertain tunnel entrances or parking garage entrances. Because the lighting conditions in tunnels or garages ordinarily differs from lighting conditions outside the tunnel or garage, a corresponding allocation of processor/computing power can also take place.

The allocation of processor/computing times can be used for any functions. These do not necessarily have to be image processing algorithms. The method may be applied to any function that requires computing time.

Further advantages result from the use of a computer program stored on a machine-readable storage medium that causes a computing unit to carry out a method according to the statements above when it is executed on the computing unit.

A further advantageous specific embodiment of the present invention is realized by the computing unit, in particular a regulator for an electrical machine that is set up to carry out a method according to the above statements through the computer program provided on the computing unit, in particular on a storage medium of the computing unit, and/or through a corresponding integrated circuit. In this way, synergies result, because the computing unit, in particular the regulator, is used not only to regulate the electrical machine, but is also set up to carry out the method according to the present invention.

DETAILED DESCRIPTION OF EXAMPLE EMBODIMENTS

The following exemplary embodiments relate to a vehicle system in a vehicle that has at least two functions. The method is suitable in particular for driver assistance systems in which computing-intensive functions are carried out, for example in the form of image processing algorithms, but however is not limited to these. In general, the method can be applied anywhere where a plurality of functions must share available computing power and computing time.

To carry out the following method, the vehicle has at least one control device by which the allocation of processor/computing times of a processor or of a computing unit for the vehicle system takes place. This control device is not absolutely necessary. The manner in which individual steps of the method are assigned, and to which units they are assigned, can vary depending on the application.

Figure 2:
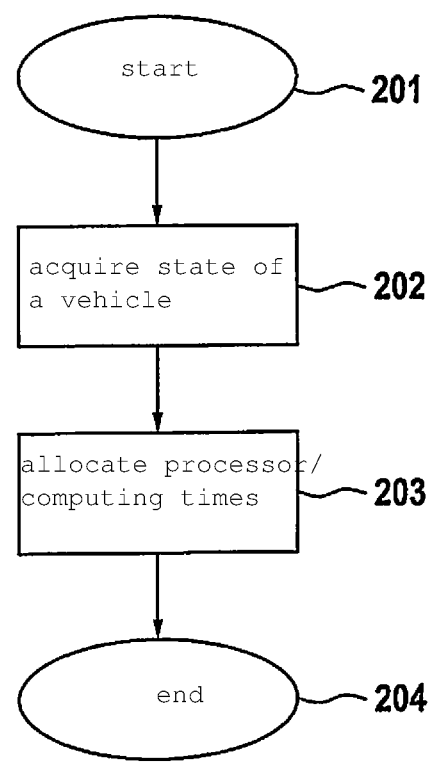
FIG. 2 shows a method diagram.

FIG. 2 shows an example of a method sequence. The method starts at step 201.

In step 202, in a control device the state of a vehicle is acquired on the basis of a signal representing the vehicle state. The vehicle state can for example be a speed, a steering angle, an acceleration, or a setting of an operating element, in particular a gas pedal or brake pedal. The signal representing this vehicle state contains all relevant information concerning the vehicle state. The signal does not have to contain precise values relating to individual driving states, such as a precise speed, but can also contain merely rough classifications, such as the classification of the speed as low, medium, or high.

In step 203, the control device carries out an allocation of processor/computing times of a processor or of a computing unit to at least two functions of a vehicle system. In this case, the vehicle system is a driver assistance system. The at least two functions can be for example functions for object recognition, realized for example by corresponding image processing algorithms.

The functions can here fulfill different tasks, such as recognizing different objects. Depending on the driving situation, particular object types may be of greater interest than others. Using the method, it is possible to allocate different computing times to the individual functions as a function of the signal representing the vehicle state. In this way, for example in driving situations in which the presence of pedestrians is expected, functions for recognizing pedestrians can be provided with more computing power, or longer computing times, than other functions that are of lesser interest in such areas.

The method ends at step 204.

Figure 3:
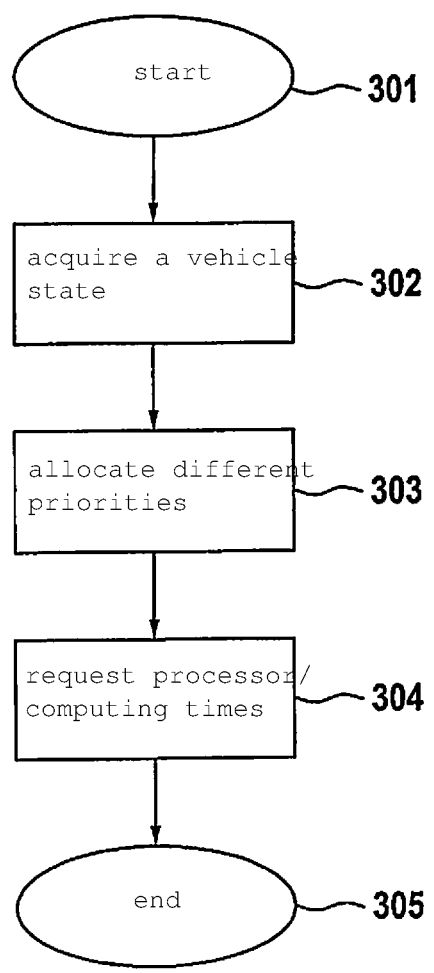
FIG. 3 shows a further method diagram.

FIG. 3 shows another example of the method. This starts in step 301.

In step 302, a vehicle state is again acquired in a control device, using a signal representing the vehicle state. The signal representing the vehicle state can be obtained in various ways. For this purpose, internal vehicle parameters can be read out, such as accelerations, speeds, steering angles, or the setting of operating elements. Alternatively, the signal representing the vehicle state can also be obtained in some other way. For example, relevant information can be obtained by recording the surrounding environment using a camera and evaluating the images produced by the camera, using an image processing algorithm. The signal representing the vehicle state can also contain information about a curved travel path, speeds, acceleration, or other details that are of interest and that can be extracted from camera images. In addition, the signal representing the vehicle state can contain information about the current surrounding environment of the vehicle, such as whether the vehicle is currently moving in a town or on a highway. This information can be obtained for example through traffic sign recognition or through more complex image processing algorithms that are applied to images from an environmental sensor system present in the vehicle.

In step 303, different priorities are allocated to the at least two functions. This allocation takes place as a function of the signal representing the vehicle state. Depending on the vehicle state, for example the speed, various functions can be given higher or lower priority. If the different functions have for example different tasks, such as the detection of pedestrians and the detection of other vehicles, then for example at low speeds the function for detecting pedestrians can be given higher priority.

In step 304, control loops are used to request processor/computing times of a processor or computing unit for the various functions. The allocation of the processor/computing times to the various functions here takes place in the sequence of the previously assigned priorities of the functions. Thus, the allocation of processor/computing times to the various functions in this case takes place via a previously carried out prioritization of the various functions as a function of the signal representing the vehicle state.

The method ends in step 305.

Figure 1:
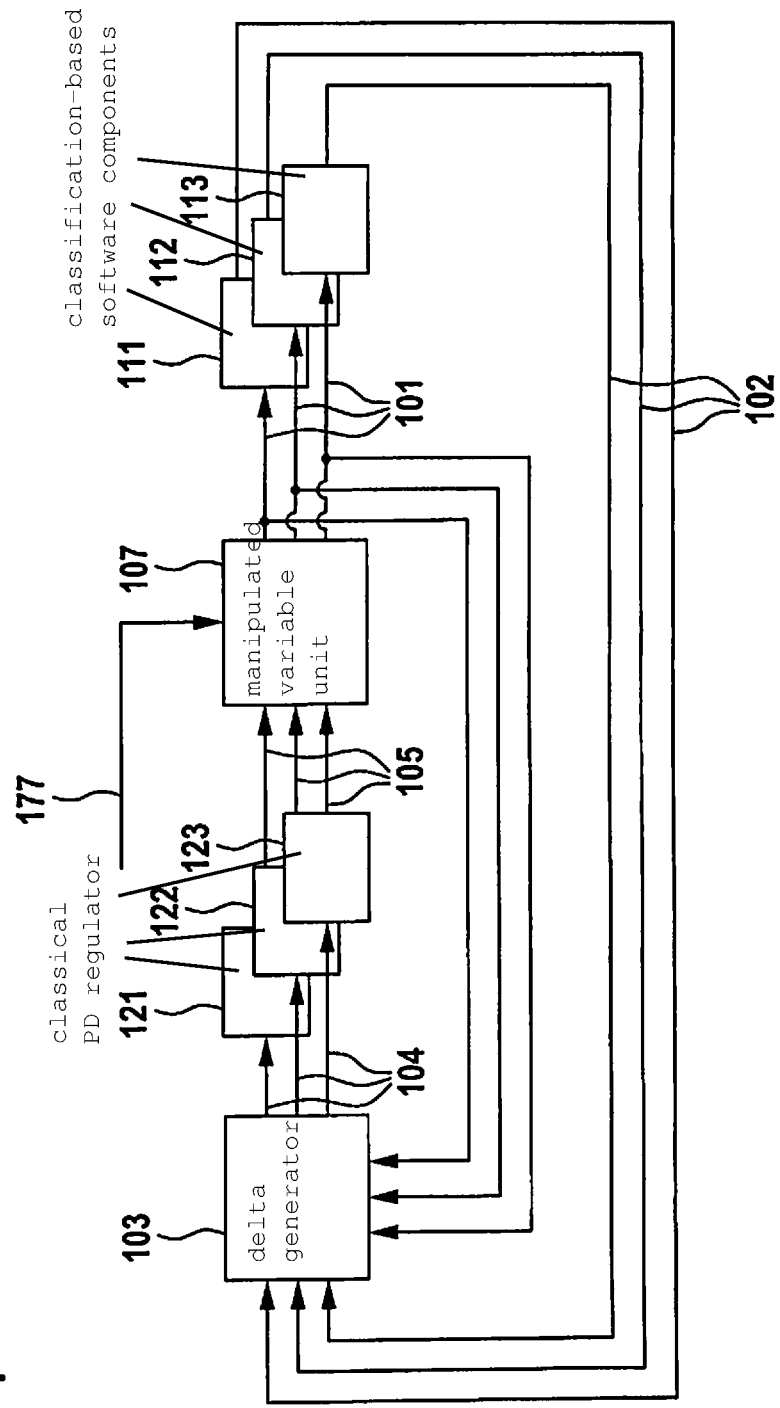
FIG. 1 shows an example of a control loop for the realization of the method.

In FIG. 1, a further system is shown with which the computing power of a vehicle system can optimally be adapted to functions present in the vehicle system. The goal of the method running in the vehicle system is to enable an efficient use of the computing power by using attractive runtime regulation. In the following, runtime regulation and the allocation of runtimes are understood as the allocation of processor/computing times of a processor or of a computing unit to various functions.

The control loop shown in FIG. 1 supplies a critical module for the more efficient use of available computing power. Through the introduction of the adaptive runtime regulation presented here, developed for specific power-hungry/computing-intensive image processing algorithms, the compromise between reduction of image processing performance through limited computing resources and high availability of the overall vehicle system is reduced.

In this example, an attractive, real-time-capable regulation is presented for the efficient distribution of the runtime among three central image processing algorithms. The approach itself is applicable to a wide variety of systems that do not necessarily have to include image processing algorithms.

A goal of the method is a need-oriented allocation of runtime resources in the sense of runtime regulation in a closed control loop, taking into account limitations inherent to the system, using priority-based manipulated variable limitation. The allocation of the priorities to the individual image processing algorithms or software components takes place in real time on the basis of particular input signals that permit an inference to the current driving situation. In contrast to classical system design for maximum runtime requirements, this results in a more efficient use of the available computing power. This holds in particular for a grouping of software components whose runtime requirements are not correlated and in addition are strongly dependent on the visible surrounding environment.

In the sample control loop, for three central, classification-based software components (SK) 111, 112, 113 for pedestrian recognition (PDET) 111, vehicle recognition (MOD) 112, and traffic sign recognition (RSR) 113, the required runtimes 101 are regulated in real time and are adaptively limited. The regulation paths are given by the involved software components 111, 112, 113, having a respective input 101

$$u_k = t_k^l$$

and outputs 102

$$y_k = [t_k^r\, j_k]^T.$$

The quantity $$t_k^l \in [0, t^{cl}]$$

here describes the commanded and locally limited runtime limit, whose upper bound is given by the cumulative runtime limit $$t^{cl} \in \mathbb{R}^{\geq 0}$$

of the grouping of all software components. The quantity $$t_k^r \in \mathbb{R}^{\geq 0}$$

represents the actually consumed runtime, and $$j_k \in [0,1]$$

represents the portions of the software component-internal tasks that could be concluded, where $j_k=1$ is synonymous with all tasks, and $j_k=0$ corresponds to no processing.

In addition, upstream from each control path there is connected a classical PD regulator 121, 122, 123, having the sample regulating law $$t_{k+1}^c = t_k^c + K_P(e_k + K_D[e_k^{LP} - e_{k-1}^{LP}])$$

with sample control deviation 104

$$e_k = \begin{cases} t_k^r - t_k^l, & j_k = 1 \\ \dfrac{(1-j_k)}{j_k} t_k^l, & j_k < 1 \end{cases}$$

and its lowpass-filtered value $$e_k^{LP} = K_{LP} e_k + (1 - K_{LP}) e_{k-1}^{LP},\ \text{mit}\ 0 < K_{LP} < 1$$

where $$t_k^c \in \mathbb{R}$$

describes the unlimited manipulated variable and $$K_{(\cdot)} \in \mathbb{R}$$

describes the parameters for the regulator and low-pass filter. The ascertaining of the regulation deviation 104 and its lowpass-filtered value can be carried out for example in a delta generator 103.

In order in addition to guarantee a high availability of the overall system, $t^{cl}$ is selected to be static, and thus creates the frame for the manipulated variable limitation, carried out for example in a separate manipulated variable unit 107. In manipulated variable unit 107, each of the three involved control loops requests, in the sequence of their priority 177, runtimes 101 for the subordinate software components 111, 112, 113. The allocation then takes place according to $$t_k^l = \begin{cases} t_k^c, & t_{SK}^{cl} \geq t_k^c \\ t_{SK}^{cl}, & t_{SK}^{cl} < t_k^c \end{cases}$$

Here, $$t_{SK}^{cl} \geq t_{SK}^{lo}$$

describes the portion of $t^{cl}$ that is still available to the corresponding software component minus all already-allocated runtime limits, where $$t_{SK}^{lo}$$

corresponds to a likewise static guaranteed minimum. In the present case, the priority assignment is a function of the current inherent speed $$v_k^{ego}$$

of the vehicle, and is determined in a separate unit which receives, inter alia, a signal representing a vehicle state. In this exemplary embodiment, priority 107 70 turns out as follows, from high to low:

$$p_k = \begin{cases} [PDET, MOD, RSR], & v_k^{ego} < v_{lo}^{ego} \\ [MOD, PDET, RSR] & v_k^{ego} > v_{hi}^{ego} \end{cases}$$

This is based on the assumptions that, for latency reasons, the software components for pedestrian recognition 111 and for vehicle recognition 112 have to satisfy higher latency requirements in principle than does the component for traffic sign recognition 113. It is also assumed that the software component for pedestrian recognition 111 is to be rated as more relevant in the lower speed range than is the software component for vehicle recognition 112.

Alternatively to the speed, other vehicle parameters can also be read in. For example, depending on the steering angle, image processing algorithms from different cameras can be given different priority levels. Thus, for example image processing algorithms or corresponding functions of the images from cameras, whose range of detection is better suited for acquiring a surrounding environment of the vehicle when traveling through a curve to the left, can be given higher priority when traveling through a curve to the left than corresponding functions for processing images from a camera that is better suited for detecting a surrounding environment of the vehicle when traveling through a curve to the right.

In addition, priorities can be adapted to a specific surrounding environment via an operating element. For example, functional demands on the driver assistance system in off-road operation differ from those in street operation, which in turn has an effect on the prioritization of lower-level image processing algorithms. For example, in off-road operation, for recognizing passages that can be traveled a determination of the surrounding environment topology can be preferred to an emergency brake function or a lane departure warning system. Parts of the software not relevant to the function can be put into a limited functional state via the control loop.

What is claimed is:

1. A method for allocating processor/computing times of a processor or of a computing unit for a driver assistance system of a vehicle, comprising:
    allocating processor/computing times to at least two functions of the driver assistance system as a function of a signal representing a state of the vehicle, wherein each function has assigned to it a control loop such that prior to the functions being executed each of the respective control loops requests a processor/computing time for the associated function.

2. The method as recited in claim 1, wherein a priority is assigned to each function, and the control loops request the respective processor/computing times for the associated functions in a sequence of the priority of the functions.

3. The method as recited in claim 2, wherein the associated priorities are assigned to the functions as a function of the signal representing the vehicle state.

4. The method as recited in claim 1, wherein the processor/computing times allocated to the functions are adapted as a function of a ratio of tasks given to the function to tasks processed by the function in the allocated processor/computing time.

5. The method as recited in claim 1, wherein the processor/computing times allocated to the functions are adapted as a function of at least one of a difference and a ratio of the processor/computing time allocated to the function and the processor/computing time actually required by the function for the processing of tasks given to the function.

6. The method as recited in claim 1, wherein at least one of the functions is for object recognition, the object recognition for recognizing vehicles or pedestrians or traffic signs.

7. The method as recited in claim 1, wherein the vehicle state is one of: a speed, a steering angle, an acceleration, or a setting of an operating element, the operating element including a gas pedal or brake pedal.

8. The method as recited in claim 1, wherein the allocation of the processor/computing times takes place as a function of environmental parameters, the environmental parameters including a brightness.

9. The method as recited in claim 1, further comprising:
    determining a cumulative runtime limit for performance of all the functions; and
    after a first of the control loops with a priority higher than a second of the control loops requests a respective processor/computing time for the associated function, and before the second control loop requests a respective processor/computer time for the associated function, determining a portion of the cumulative runtime limit that remains unallocated.

10. A computing unit for allocating processor/computing times of a processor or of a computing unit for a driver assistance system of a vehicle, the computing unit designed to:
    allocate processor/computing times to at least two functions of the driver assistance system as a function of a signal representing a state of the vehicle, wherein each function has assigned to it a control loop such that prior to the functions being executed each of the respective control loops requests a processor/computing time for the associated function.

11. The computing unit as recited in claim 10, wherein the computing unit is a regulator for an electrical machine, set up, through a corresponding integrated circuit and/or through a computer program stored on a memory, to perform the allocation.

12. The computing unit as recited in claim 10, wherein the computing unit is designed to:
 determine a cumulative runtime limit for performance of all the functions; and
 after a first of the control loops with a priority higher than a second of the control loops requests a respective processor/computing time for the associated function, and before the second control loop requests a respective processor/computer time for the associated function, determine a portion of the cumulative runtime limit that remains unallocated.

\* \* \* \* \*